Patented June 3, 1924.

1,496,064

UNITED STATES PATENT OFFICE.

EUGENE L. MAUPAI, OF NEW YORK, N. Y.

PROCESS OF TREATING SILK.

No Drawing. Application filed March 31, 1923. Serial No. 629,166.

*To all whom it may concern:*

Be it known that I, EUGENE L. MAUPAI, a citizen of the United States of America, residing at New York city, county, and State of New York, have invented certain new and useful Improvements in Processes of Treating Silk, of which the following is a specification.

This invention relates to a process of treating silk, more particularly for weighting the silk in the grege (single end, not thrown) and thrown or twisted silk in the gum, the main object being to render the silk in a condition so as to adapt it to more readily and effectively retain the tin solutions usually employed in weighting the silk.

In carrying out my invention, I proceed as follows:

I first harden the raw or grege silk, so as to produce an insulation or hardening of the fatty or cereceous substances contained in and around the silk threads, and for this purpose, I may use a metallic salt, diluted in water, such, for instance, as chromium chloride, ferrous nitrite of iron or alum, a suitable method which I may employ for so hardening the cereceous or gummy substances being described in my United States Patent No. 1,352,014, dated September 7, 1920. The silk is then subjected to any of the well known weighting processes common in the dyeing art, such as impregnation in a tin solution. It is then washed, neutralized with an alkali, dried and woven, and, thereupon degummed and dyed.

I find that by first treating the silk so as to produce a hardening of the cereceous or gummy matter to effect what I call an insulation of the threads, a greater affinity for the tin weighting solution is present, and consequently more of the metallic weighting solution will adhere to the thread fibres than if the same were not initially pre-hardened as above described. My pre-hardening treatment also helps the fiber, after the tin weighting treatment, to more effectively absorb and hold the colors employed both to light and alkali.

In general I find that by my improved process I am able to obtain several advantages over the silk weighting processes heretofore commonly employed, i. e., a higher percentage of tin weighting, less tendency of tendering the fiber, and better color absorption and retention, besides dispensing with the throwing of the silk.

Having described my invention what I claim is;

1. The process of treating silk, which consists in first hardening the natural gum or cereceous matter therein contained and then subjecting the threads to a metallic weighting solution.

2. The process of treating raw silk, which consists in first hardening the silk threads with a metallic salt, and thereupon impregnating the silk in a metallic weighting solution.

3. The process of treating silk which consists in initially hardening the gummy substances in and on it, and then impregnating it in a tin solution.

4. The process of treating silk which consists in pre-hardening the silk threads with a metallic salt and then impregnating the silk in a separate metallic weighting solution.

5. A step in the treatment of silk for weighting same with metallic salts which consists in prehardening the fibres before impregnation in the metallic solutions.

6. The process of treating silk which consists in first hardening the silk in the skeins, then impregnating it in a tin solution, then washing the silk, then drying and weaving it, and finally degumming and dyeing the silk.

7. Treating raw silk by creating a hardened insulation of threads and thereupon impregnating the same in a weighting solution.

EUGENE L. MAUPAI.